United States Patent
Byrne et al.

(10) Patent No.: US 9,971,785 B1
(45) Date of Patent: May 15, 2018

(54) SYSTEM AND METHODS FOR PERFORMING DISTRIBUTED DATA REPLICATION IN A NETWORKED VIRTUALIZATION ENVIRONMENT

(71) Applicant: Nutanix, Inc., San Jose, CA (US)

(72) Inventors: Brian Byrne, San Jose, CA (US); Parthasarathy Ramachandran, Palo Alto, CA (US); Mohit Aron, Los Altos, CA (US)

(73) Assignee: Nutanix, Inc., San Jose, CA (US)

( * ) Notice: Subject to any disclaimer, the term of this patent is extended or adjusted under 35 U.S.C. 154(b) by 457 days.

(21) Appl. No.: 14/019,139

(22) Filed: Sep. 5, 2013

(51) Int. Cl.
*G06F 17/30* (2006.01)

(52) U.S. Cl.
CPC .. *G06F 17/30174* (2013.01); *G06F 17/30575* (2013.01); *G06F 17/30578* (2013.01)

(58) Field of Classification Search
None
See application file for complete search history.

(56) References Cited

U.S. PATENT DOCUMENTS

| | | | | |
|---|---|---|---|---|
| 7,606,868 | B1* | 10/2009 | Le | G06F 17/30067 707/999.01 |
| 7,720,815 | B1* | 5/2010 | Jagannathan | 707/640 |
| 7,987,152 | B1* | 7/2011 | Gadir | G06F 17/30566 707/602 |
| 8,301,593 | B2 | 10/2012 | Hoffmann et al. | |
| 8,341,115 | B1 | 12/2012 | Natanzon et al. | |
| 8,473,557 | B2 | 6/2013 | Ramakrishnan et al. | |
| 8,601,473 | B1 | 12/2013 | Aron et al. | |
| 2003/0041074 | A1 | 2/2003 | Vasudevan et al. | |
| 2005/0078854 | A1* | 4/2005 | Shikano | G06K 9/00664 382/103 |
| 2006/0195666 | A1 | 8/2006 | Maryuama et al. | |
| 2008/0059555 | A1* | 3/2008 | Archer | G06F 9/5027 709/201 |
| 2010/0250718 | A1 | 9/2010 | Igarashi | |
| 2010/0281166 | A1* | 11/2010 | Buyya | G06F 9/5072 709/226 |
| 2012/0246642 | A1* | 9/2012 | Pafumi et al. | 718/1 |
| 2013/0007741 | A1 | 1/2013 | Britsch | |

(Continued)

OTHER PUBLICATIONS

"Good Migrations-Moving Data from SAN to SAN": by George Crump: pp. 1-7: StorageSwiss.com: Jul. 18, 2013.*

(Continued)

*Primary Examiner* — Rehana Perveen
*Assistant Examiner* — Raheem Hoffler
(74) *Attorney, Agent, or Firm* — Vista IP Law Group, LLP

(57) ABSTRACT

A method for performing distributed data replication from a source cluster of nodes to a destination cluster of nodes includes electing a master file management instance and slave file management instances for the source cluster of nodes, identifying a set of files to be replicated, assigning the identified set of files to the master file management instance and the slave file management instances, processing the identified set of files by the master file management instance and the slave file management instances and performing replication on the processed set of files by file replication instances corresponding to the master and slave file management instances at the source cluster of nodes.

33 Claims, 12 Drawing Sheets

(56) References Cited

U.S. PATENT DOCUMENTS

| | | | |
|---|---|---|---|
| 2013/0047161 A1* | 2/2013 | Simitsis | G06F 9/5027 718/100 |
| 2014/0095817 A1 | 4/2014 | Hsu | |
| 2014/0317265 A1 | 10/2014 | James | |
| 2015/0066846 A1 | 3/2015 | Beard | |
| 2015/0134606 A1* | 5/2015 | Magdon-Ismail et al. | ... 707/610 |

OTHER PUBLICATIONS

"ESG Lab Review: Nutanix Complete Cluster": by Ginny Roth, Tony Palmer and Emil Flock: pp. 1-14: Enterprise Strategy Group: May 2012.*
Non-final Office Action dated Jun. 30, 2016 for related U.S. Appl. No. 14/270,705.
Final Office Action dated Sep. 16, 2016 for related U.S. Appl. No. 14/027,576.
Advisory Action dated Nov. 30, 2016 for related U.S. Appl. No. 14/027,576.
Final Office Action dated Dec. 14, 2016 for related U.S. Appl. No. 14/270,705.
Non-final Office Action dated May 27, 2015 for related U.S. Appl. No. 14/027,576.
Final Office Action dated Dec. 1, 2015 for related U.S. Appl. No. 14/027,576.
Non-final Office Action dated Apr. 18, 2016 for related U.S. Appl. No. 14/027,576.
Non-Final Office Action dated Mar. 15, 2017 for related U.S. Appl. No. 14/027,576.
Non-Final Office Action dated Mar. 23, 2017 for related U.S. Appl. No. 14/270,705.
Notice of Allowance and Fee(s) Due dated Jul. 11, 2017 for related U.S. Appl. No. 14/270,705.
Final Office Action dated Jul. 17, 2017 for related U.S. Appl. No. 14/027,576.
Advisory Action dated Sep. 25, 2017 for related U.S. Appl. No. 14/027,576.
Notice of Allowance and Fee(s) Due dated Feb. 12, 2018 for related U.S. Appl. No. 14/027,576.

* cited by examiner

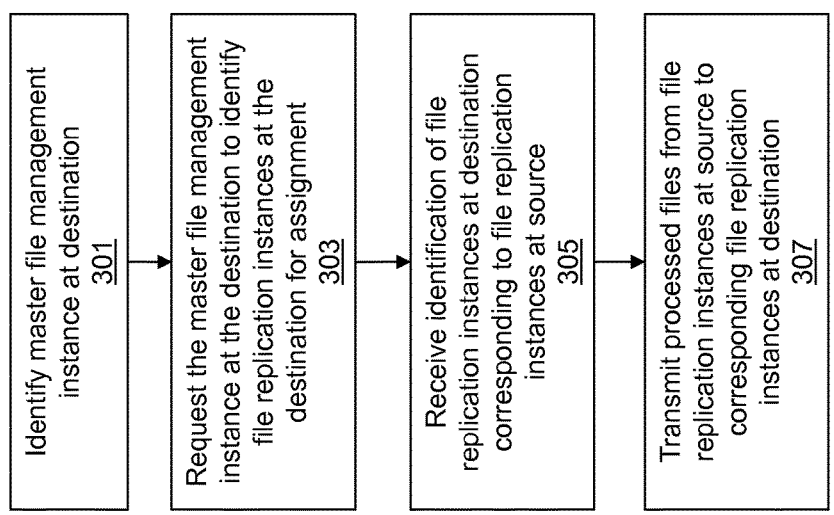

SYSTEM AND METHODS FOR PERFORMING DISTRIBUTED DATA REPLICATION IN A NETWORKED VIRTUALIZATION ENVIRONMENT

CROSS REFERENCE TO RELATED APPLICATIONS

The present application is related to application Ser. No. 13/207,345, filed on Aug. 10, 2011, entitled "ARCHITECTURE FOR MANAGING I/O AND STORAGE FOR A VIRTUALIZATION ENVIRONMENT", which is all hereby incorporated by reference in their entirety.

FIELD

This disclosure concerns a system and method for performing data replication, and in particular to a system and method for performing distributed data replication and disaster recovery in a networked virtualization environment for storage management.

BACKGROUND

Data replication involves replicating data located at a source to a destination. This may be performed for the purpose of disaster recovery, where data replicated from the source to the destination may be later recovered at the destination when the source undergoes failure. In a networked environment the source includes several nodes (e.g., servers, data centers, etc.) that are in communication amongst each other and the destination includes several nodes (e.g., servers, data centers, etc.) that are also in communication amongst each other. Conventionally, a subset of nodes at the source is selected as dedicated nodes for performing data replication for all of the nodes at the source. This subset of nodes typically communicates with a corresponding dedicated subset of nodes at the destination on a one-to-one basis in order to facilitate data replication. For example, if two nodes at the source are selected as dedicated nodes for data replication, then these two nodes will communicate with a corresponding dedicated two nodes at the destination in order to facilitate data replication.

Because only a dedicated subset of nodes at the source are utilized for performing data replication, the workload imposed on that subset of nodes may lead to inefficiencies in resource usage. When the number of nodes located at the source grows, the dedicated subset of nodes at the source may incur increased strain in providing data replication for all the nodes at the source. Additionally, because the dedicated subset of nodes at the source communicate with a corresponding dedicated subset of nodes at the destination on a one-to-one basis, the dedicated subset of nodes at the destination may be underutilized or over utilized at any given time depending on the amount of data being replicated.

SUMMARY OF THE INVENTION

Embodiments of the present invention provide a mechanism for performing distributed data replication in a networked virtualized environment. According to some embodiments, a master file management instance and slave file management instances for the source cluster of nodes are elected, a set of files to be replicated are identified, the identified set of files are assigned to the master file management instance and the slave file management instances, the identified set of files are processed by the master file management instance and the slave file management instances, and replication on the processed set of files is performed by file replication instances corresponding to the master and slave file management instances at the source cluster of nodes.

Further details of aspects, objects and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 3 is a flow diagram illustrating a method for transmitting data from a source cluster of nodes to a destination cluster of nodes for the purpose of data replication according to some embodiments of the invention.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments", in various places throughout this specification are not necessarily referring to the same embodiment or embodiments.

Data replication involves replicating data located at a source to a destination. This may be performed for the purpose of disaster recovery, where data replicated from the source to the destination may be later recovered at the destination when the source undergoes failure. In a networked environment the source includes a cluster of several nodes (e.g., servers, data centers, etc.) that are in communication amongst each other and the destination includes a separate cluster of several nodes (e.g., servers, data centers, etc.) that are also in communication amongst each other. Conventionally, a subset of nodes at the source is selected as dedicated nodes for performing data replication for all of the nodes at the source. This subset of nodes typically communicates with a corresponding dedicated subset of nodes at the destination on a one-to-one basis in order to facilitate data replication. For example, if two nodes at the source are selected as dedicated nodes for data replication, then these two nodes will communicate with a corresponding dedicated two nodes at the destination in order to facilitate data replication.

Because only a dedicated subset of nodes at the source are utilized for performing data replication, the workload imposed on that subset of nodes may lead to inefficiencies in resource usage. When the number of nodes located at the source grows, the dedicated subset of nodes at the source may incur increased strain in providing data replication for all nodes at the source. Additionally, because the dedicated subset of nodes at the source communicate with a corresponding dedicated subset of nodes at the destination on a one-to-one basis, the dedicated subset of nodes at the destination may be underutilized or over utilized at any given time depending on the amount of data being replicated.

Figure 1:
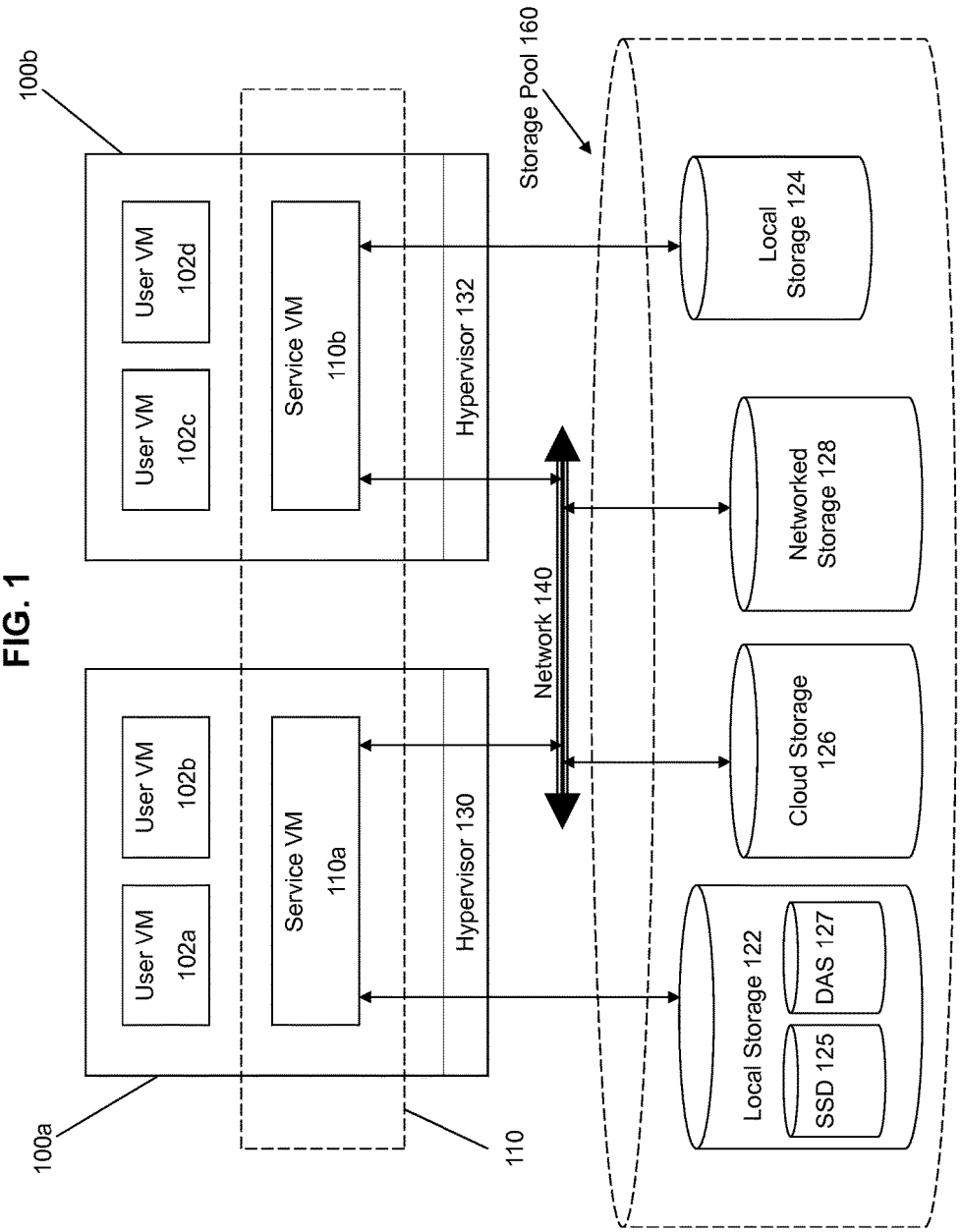
FIG. 1 illustrates a networked virtualization environment for storage management according to some embodiments of the invention.

FIG. 1 illustrates a networked virtualization environment for storage management according to some embodiments of the invention. The networked virtualization environment for storage management of FIG. 1 may be representative of either the cluster of nodes at the source or the cluster of nodes at the destination for implementing data replication/disaster recovery.

The networked virtualization environment of FIG. 1 can be implemented for a distributed platform that contains multiple nodes (e.g., servers) 100a and 100b that manages multiple-tiers of storage. The multiple tiers of storage include storage that is accessible through a network 140, such as cloud storage 126 or networked storage 128 (e.g., a SAN or "storage area network"). Unlike the prior art, the present embodiment also permits local storage 122/124 that is within or directly attached to the node and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structure from the storage devices in the storage pool 160. As used herein, the term vDisk refers to the storage abstraction that is exposed by a Service/Controller VM to be used by a user VM. In some embodiments, the vDisk is exposed via iSCSI ("internet small computer system interface") or NFS ("network file system") and is mounted as a virtual disk on the user VM.

Each node 100a or 100b runs virtualization software, such as VMWare ESX(i), Microsoft Hyper-V, or RedHat KVM. The virtualization software includes a hypervisor 130/132 to manage the interactions between the underlying hardware and the one or more user VMs 102a, 102b, 102c and 102d that run client software.

A special VM 110a/110b is used to manage storage and I/O activities according to some embodiments of the invention, which is referred to herein as a "Service VM" or "Controller VM". This is the "Storage Controller" in the currently described networked virtualization environment for storage management. Multiple such storage controllers coordinate within a cluster to form a single-system. The Controller VMs 110a/110b are not formed as part of specific implementations of hypervisors 130/132. Instead, the Controller VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Controller VMs run above the hypervisors 130/132, this means that the current approach can be used and implemented within any virtual machine architecture, since the Controller VMs of embodiments of the invention can be used in conjunction with any hypervisor from any virtualization vendor.

Each Controller VM 110a-b exports one or more block devices or NFS server targets that appear as disks to the client VMs 102a-d. These disks are virtual, since they are implemented by the software running inside the Controller VMs 110a-b. Thus, to the user VMs 102a-d, the Controller VMs 110a-b appear to be exporting a clustered storage appliance that contains some disks. All user data (including the operating system) in the client VMs 102a-d resides on these virtual disks.

Significant performance advantages can be gained by allowing the virtualization environment to access and utilize local (e.g., server-internal) storage 122. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization environment is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Another advantage provided by this approach is that administration activities can be handled on a much more efficient granular level. Recall that the prior art approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Controller VM 110*a* can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Controller VMs include quality of service (QOS) functions, encryption and compression. The networked virtualization environment massively parallelizes storage, by placing a storage controller—in the form of a Controller VM—at each hypervisor, and thus makes it possible to render enough CPU and memory resources to achieve the aforementioned optimizations.

Additional details regarding networked virtualization environments for storage management are described in co-pending application Ser. No. 13/207,345, entitled "Architecture for Managing I/O and Storage for a Virtualization Environment", which is hereby incorporated by reference in its entirety.

Although the networked virtualization environment depicted in FIG. 1 includes a cluster of only two nodes, one ordinarily skilled in the art will recognize that the networked virtualization environment may be extended to include a cluster of any number of nodes.

During data replication, the cluster of nodes at the source must first determine what files are to be replicated. This is typically done by taking a snapshot of the virtual disks residing within the cluster. In some situations, data replication takes place across all nodes in a cluster and a snapshot of each virtual disk is taken. In other situations, data replication occurs only across a subset of nodes in the cluster, or a subset of virtual disks within a node. The determination of which files to be replicated may differ depending on the particular setup for a cluster of nodes and the configuration of the data replication mechanism for that cluster of nodes.

Once the files for replication have been determined processing of those files may be performed prior to transmission to the destination cluster of nodes. Processing usually consists of determining the difference between a previously replicated set of files and the current set of files to be replicated. In this way, data replication can be performed more efficiently as only information pertaining to files that have changed between a previous act of data replication action and the current act of data replication are transmitted.

Conventionally, only a dedicated subset of nodes within the source cluster of nodes would be responsible for processing the files to be replicated. This is disadvantageous because relying on a dedicated subset of nodes for performing processing may lead to inefficient resource usage. For example, where the cluster of nodes include several different nodes, but only a small number of dedicated nodes for initiating data replication, the process of initiating data replication may create great strain on the resources of the dedicated nodes. Likewise, dedicating a subset of nodes for performing data replication leads to an inflexible system where nodes otherwise available for assisting in data replication are not utilized because they are not part of the dedicated subset.

However, in the virtualization environment for storage management depicted in FIG. 1, all of the controller VMs for each node in the cluster may communicate amongst each other to divide up work for performing data replication. This allows the work of initiating data replication (e.g., processing of files to be replicated) to be spread amongst several different nodes rather than a dedicated subset of nodes.

Figure 2:
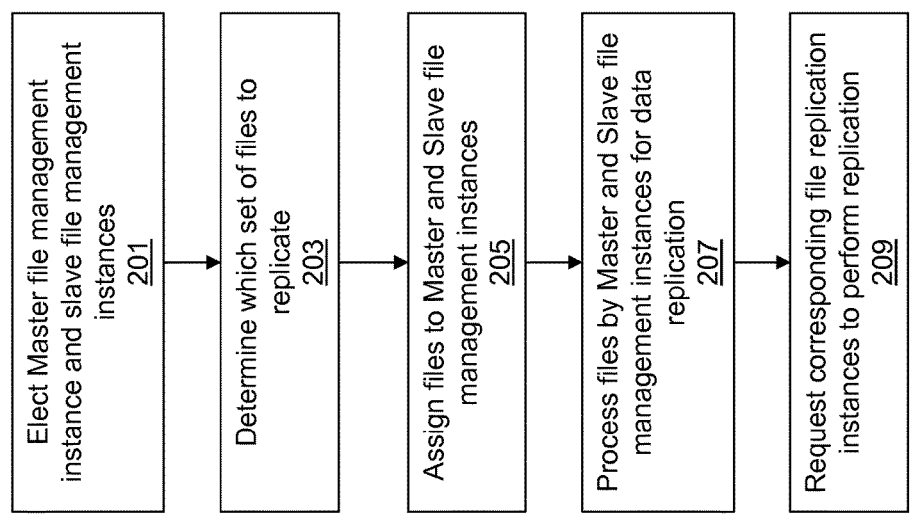
FIG. 2 is a flow diagram illustrating a method for initiating data replication for a source cluster of nodes according to some embodiments of the invention.

FIG. 2 is a flow diagram illustrating a method for initiating data replication for a source cluster of nodes according to some embodiments of the invention. Such initiation of data replication may be for the purposes of providing disaster recovery to the source cluster of nodes in case of failure. The method for initiating data replication/disaster recovery involves first dynamically assigning work to different controller VMs within the cluster of nodes such that the work required to initiate data replication is efficiently distributed. Each controller VM may include a file management instance and a file replication instance. The file management instances are used to retrieve files for replication and to determine how replication is to be performed, while the file replication instance is used to replicate files and the associated metadata for those files. An example of a file management instance is a Cerebro instance and an example of a file replication instance is a Stargate instance.

Initially, an election is performed amongst the file management instances corresponding to the controller VMs to elect a master file management instance and slave file management instances as shown at 201. Each file management instance has a corresponding file replication instance.

Various different mechanisms may be used to elect the master file management instance and slave file management instances. The master file management instance acts a leader and assigns work to be distributed amongst the slave file management instances. Although the master file management instance assigns work to be distributed amongst the slave file management instances, it too acts as a slave file management instance in the sense that it also performs a subset of work. Each file management instance may perform the work of retrieving files to be replicated and determining how files should be replicated and may then utilize its corresponding file replication instance to perform the actual file replication and metadata replication.

In some embodiments, all of the file management instances within the source cluster of nodes are candidates for fulfilling the roles of master file management instance and slave file management instances. In other embodiments, only file management instances that meet certain criteria are selected as candidates for fulfilling the roles of master file management instance and slave file management instances. For example, the set of candidate file management instances chosen may be those that are servicing an amount of I/O requests for their corresponding user VMs that fall below a particular threshold. Those file management instances that are servicing an amount of I/O requests for their user VMs that lie above the threshold may incur heavy strain if elected to serve as a master or slave file management instance and as such may not be placed in the candidate pool of file management instances.

By dynamically electing a master file management instance and slave file management instances for initiating data replication, the resources of the source cluster of nodes may be better utilized. No longer does the source cluster of nodes have to rely on a dedicated subset of nodes for initializing data replication. Instead, any set of nodes and their corresponding file management instances within the source cluster of nodes may be selected for performing initialization of data replication depending on the state of resource usage in the source cluster of nodes at the time that initialization of data replication is to begin.

A determination is then made as to which set of files are to be replicated as shown at 203. This is typically done by taking a snapshot of the virtual disks residing within the cluster. In some embodiments, data replication takes place across all nodes in a cluster and a snapshot of each virtual disk is taken. In other embodiments, data replication occurs only across a subset of nodes in the cluster, or a subset of virtual disks within a node. The determination of which files to be replicated may differ depending on the particular setup for a cluster of nodes and the configuration of the data replication mechanism for that cluster of nodes.

Files within a virtual disk may be organized into consistency groups and consistency groups may be organized into a protection domain. Data replication may be performed at various levels of granularity. For example, the determination as to which files are to be replicated may result in an entire protection domain being replicated for purposes of disaster recovery. Alternatively, the determination as to which files are to be replicated may result in one or more consistency groups within a protection domain being replicated for purposes of disaster recovery or one or more files within a consistency group being replicated for purposes of disaster recovery.

For purposes of discussion, the remainder of the description will refer to the replication of files within a source cluster of nodes. However, it is important to note that the files to be replicated may be representative of one or more consistency groups within the source cluster of nodes.

The files that are identified for replication are then assigned to the master file management instance and slave file management instances as shown at 205. These files are assigned to the different slave file management instances and master file management instance for the purpose of processing prior to transmission.

In some embodiments, the assignment of files may be based on a current workload of the slave file management instances and master file management instance. For example, a slave or master file management instance having a smaller current workload may be assigned a greater number of files, while a slave or master file management instance having a greater workload may be assigned a smaller number of files. In this way, the workload imposed on file management instances may be more efficiently distributed, as file management instances having a greater capacity are assigned more work and file management instances having a lesser capacity are assigned less work. Moreover, by assigning work in this manner, each file management instance (either slave or master) within the source cluster of nodes may continue to service I/O requests of their corresponding user VMs without incurring significant latency.

In other embodiments, the assignment of files may be equally distributed amongst the slave file management instances and the master file management instances. For example, if there are 20 files to be replicated and 4 file management instances serving as the master and slaves, each file management instance may be assigned 5 files for processing. This may be preferred in the situation where all of the file management instances acting as master and slaves have a similar capacity for work.

Once the files have been assigned by the master file management instance to the slave and master file management instances, the file management instances may perform a portion of the processing of the files for replication/disaster recovery as shown at 207. The portion of the processing performed by the file management instances may involve determining the difference between a previously replicated set of files and the current set of files to be replicated. For example, a file management instance assigned a set of 5 files for replication may first determine the most recently replicated state of those 5 files and identify the differences (e.g., delta) between the current state of those 5 files and the most recently replicated state of those 5 files. By performing such a comparison, the amount of data needed to perform replication may be significantly reduced, as only differences between a current set of files to be replicated and a previous set of files that were replicated are transmitted rather than the entirety of the current set of files.

Once the file management instances have performed their portion of the processing, each file management instance may request their corresponding file replication instance to perform the actual replication of the files as shown at 209. The replication of files performed by the file replication instances may involve replicating the differences between the current set of files to be replicated and the previous set of files that were replicated, as well as replicating metadata associated with those differences.

Initiating data replication/disaster recovery for a source cluster of nodes in the manner described in FIG. 2 allows for nodes and their corresponding file management instances within the source cluster of nodes to be efficiently assigned work. When nodes (and corresponding controller VMs) are added to the source cluster of nodes, work may be redistributed amongst the additional file management instances corresponding to the newly added controller VMs. Likewise, when nodes (and corresponding controller VMs) are removed from the source cluster of nodes, work may be redistributed amongst the file management instances corresponding to the remaining controller VMs. This provides flexibility in performing data replication, as the number of controller VMs and their corresponding file management instances involved in data replication may be scaled according to the amount of data to be replicated and the resource availability of nodes within the cluster. This is in contrast to the conventional approach where a dedicated subset of nodes is tasked with the responsibility of initializing data replication regardless of their resource utilization and capacity to take on work.

Once the files to be replicated have been processed by their corresponding slave and master file management and corresponding file replication instances, steps are taken to transmit those files to the destination cluster of nodes where they are subsequently stored. FIG. 3 is a flow diagram illustrating a method for transmitting data from a source cluster of nodes to a destination cluster of nodes for the purpose of data replication according to some embodiments of the invention. The method of FIG. 3 begins after the master and slave file management instances at the source cluster of nodes have been assigned files for data replication and have performed their portion of the processing on those files (e.g., determined differences between those files and the previous set of files that were replicated) and the file replication instances have also performed their portion of the processing on the assigned files for data replication (e.g., replicating the differences between files and replicating metadata associated with those differences).

The destination cluster of nodes is configured similarly to the source cluster of nodes, in that a master file management instance and slave file management instances are elected at the destination cluster of nodes. Again, various different mechanisms may be used to elect the master file management instance and slave file management instances at the destination cluster of nodes. Such an election may be performed in a manner similar to how election is performed at the source cluster of nodes, and as such will not be described in greater detail.

The file replication instances at the source each identify the master file management instance at the destination as shown at 301. The file replication instances at the source may identify the master file management instance at the destination by sending a request for identification to the destination cluster of nodes and receiving an ID for the master file management instance at the destination. Once the ID for the master file management instance at the destination has been received, the file replication instances at the source may begin communicating with the master file management instance at the destination using the ID.

The file replication instances at the source then request the master file management instance at the destination to identify the file replication instances at the destination for which they are assigned, as shown at 303. Upon receiving the request, the master file management instance at the destination may identify all the file replication instances at the destination and determine their current workload capacity. The master file management instance at the destination may then assign file replication instances at the source to corresponding file replication instances at the destination based on the workload capacity of the file replication instances at the destination.

The assignment of file replication instances at the destination to file replication instances at the source is performed on an any-to-any basis, such that any number of file replication instances at the source may be assigned to any number of file replication instances at the destination. The assignment of file replication instances at the source to file replication instances at the destination may be dependent on the number of files being processed by the file replication instances at the source and the workload capacities of the file replication instances at the destination.

For example, where a file replication instance at the source is processing a large amount of files and the file replication instances at the destination have a limited capacity, the file replication instances at the source may be assigned to multiple file replication instances at the destination. Alternatively, where a number of file replication instances at the source are each processing a limited number of files and a replication instance at the destination has a large capacity for work, multiple file replication instances at the source may be assigned to a single file replication instance at the destination.

In addition to performing assignment on the basis of file sizes and workload capacity, assignment may also be performed based on the type of files being replicated. A subset of files at a source file replication instance may be more efficiently assigned to a single file replication instance at the destination because that subset of files should be stored together. For example, a set of files belonging to the same consistency group may be assigned to the same file replication instance at the destination, whereas a set of files belonging to different consistency groups may be assigned to different file replication instances at the destination.

Once the master file management instance at the destination has determined the workload capacities of the file replication instances at the destination and assigned the file replication instances at the destination to corresponding file replication instances at the source, it provides the information to the requesting file replication instances at the source. The file replication instances at the source receive an identification of their corresponding file replication instances at the destination as shown at 305.

After the replication instances at the source have received identification of their corresponding file replication instances at the destination, data replication is completed by transmitting processed files from file replication instances at the source to corresponding file replication instances at the destination as shown at 307. The processed files are stored at the destination cluster of nodes and may be recovered from the destination upon failure of the source.

By assigning file replication instances at the source with corresponding file replication instances at the destination in an any-to-any manner, efficient usage of resources at the destination may be realized. This is in contrast to the conventional approach where a dedicated subset of nodes at the source is assigned to a corresponding dedicated subset of nodes at the destination on a one-to-one basis. Allowing assignment and replication to occur on an any-to-any basis ensures that workload capacity at the destination is efficiently distributed. Moreover, such a dynamic approach to data replication allows for files that are meant to be grouped together to be assigned to the same destination file replication instance and also allows for flexibility in assignment when nodes (and corresponding controller VMs) are added or removed from the destination cluster of nodes.

FIGS. 4A-D and 5A-D are schematic diagrams illustrating two examples of data replication using the method described above in FIGS. 4A-D and 5A-D according to some embodiments of the invention. For purposes of illustration, FIGS. 4A-D and 5A-D will only illustrate the controller VMs (and their corresponding file management and file replication instances) residing at the source and destination cluster of nodes. However, it is important to note that each of the controller VMs are associated with a node and are configured to service a set of user VMs by providing storage management in the manner described above with reference to FIG. 1.

FIGS. 4A-D illustrate an example of data replication where four controller VMs 401a-d at the source and four controller VMs 403a-d at the destination are utilized to perform data replication on a set of 16 files. Initially, an election process is held at the source cluster of nodes as well as the destination cluster of nodes to elect master and slave file management instances.

Figure 4A:
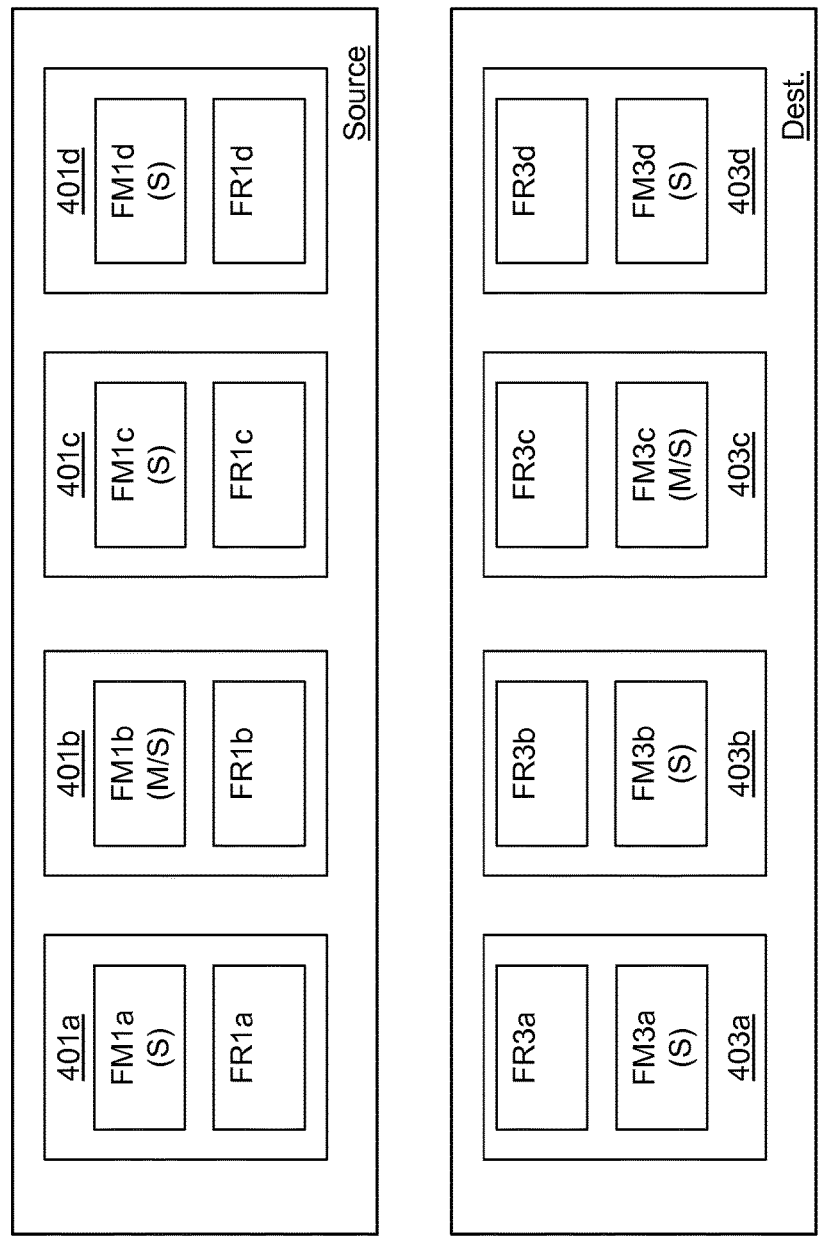
FIGS. 4A-D are schematic diagrams illustrating an examples of data replication according to some embodiments of the invention.

FIG. 4A illustrates the state of the source cluster of nodes and the destination cluster of nodes after the election process has occurred. As illustrated in FIG. 4A, all of the file management instances FM1a-d belonging to controller VMs 401a-d within the source cluster of nodes are candidates for fulfilling the roles of master file management instance and slave file management instances. Likewise, all of the file management instances FM3a-d belonging to controller VMs 403a-d within the destination cluster of nodes are candidates for fulfilling the roles of master file management instance and slave file management instances. However, it is important to note that in other circumstances, only file management instances belonging to controller VMs that meet certain criteria may be selected as candidates for fulfilling the roles of master file management instance and slave management instances at either the source or the destination.

As noted above, the master file management instance acts a leader and assigns work to be distributed amongst the slave file management instances. The slave file management instances then perform work at the direction of the master file management instance. Although the master file management instance assigns work to be distributed amongst the slave file management instances, it too acts as a slave file management instance in the sense that it also performs a subset of work.

In the source cluster of nodes, a second file management instance FM1b is elected as the master file management instance as denoted by the identifier M/S, while a first file management instance FM1a, third file management instance FM1c and fourth file management instance FM1d are elected as slave file management instances as denoted by the identifier S. Also, as illustrated in FIG. 4A, replication management instances FR1a-d are associated with corresponding file management instances FM1a-d at the source cluster of nodes.

Likewise, in the destination cluster of nodes a third file management instance FM3c is elected as the master file management instance as denoted by the identifier M/S, while a first file management instance FM3a, second file management instance FM3b and fourth file management instance FM3d are elected as slave file management instances as denoted by the identifier S. Also, as illustrated in FIG. 4A, replication management instances FR3a-d are associated with corresponding file management instances FM3a-d at the destination cluster of nodes.

Figure 4B:
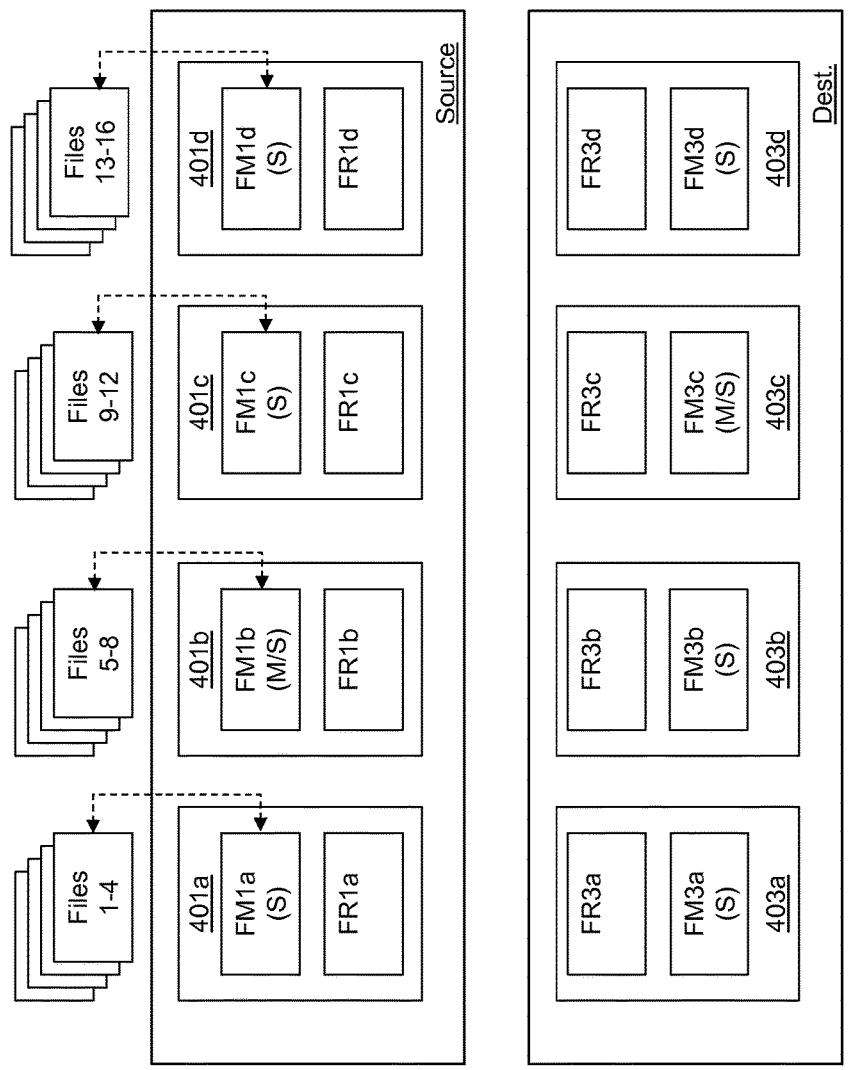

A determination is then made as to which set of files are to be replicated, which is typically accomplished by taking a snapshot of the virtual disks residing within the cluster. In the example of FIGS. 4A-D, files 1-16 are identified as those to be replicated. The files that are identified for replication are then assigned to the master and slave file management instances FM1a-d in the source cluster as illustrated in FIG. 4B. In FIG. 4B, the files are equally distributed amongst the slave file management instances FM1a, c-d and the master file management instance FM1b at the source. Such work distribution may be preferred in the situation where all of the file management instances FM1a-d acting as master and slaves have a similar capacity for work. In FIG. 4B, files 1-4 are assigned to a first slave file management instance FM1a at the source, files 5-8 are assigned to the master file management instance FM1b at the source, files 9-12 are assigned to a second slave file management instance FM1c at the source, and lastly, files 13-16 are assigned to a third slave file management instance FM1d at the source. These files are assigned to the different slave file management instances FM1a, c-d and master file management instance FM1b for the purpose of processing prior to transmission.

The files in the example illustrated in FIGS. 4A-D are equally distributed amongst the slave and master file management instances FM1a-d. However, as noted above, the assignment of files may distributed based on a current workload of the slave file management instances FM1a, c-d and master file management instance FM1b rather than being equally distributed.

Once the files have been assigned by the master file management instance FM1b to the slave and master file management instances FM1a-d, the file management instances FM1a-d may perform a portion of the processing of the files for replication. The portion of the processing performed by the file management instances FM1a-d may involve determining the difference (e.g., delta) between a previously replicated set of files and the current set of files to be replicated.

Figure 4C:
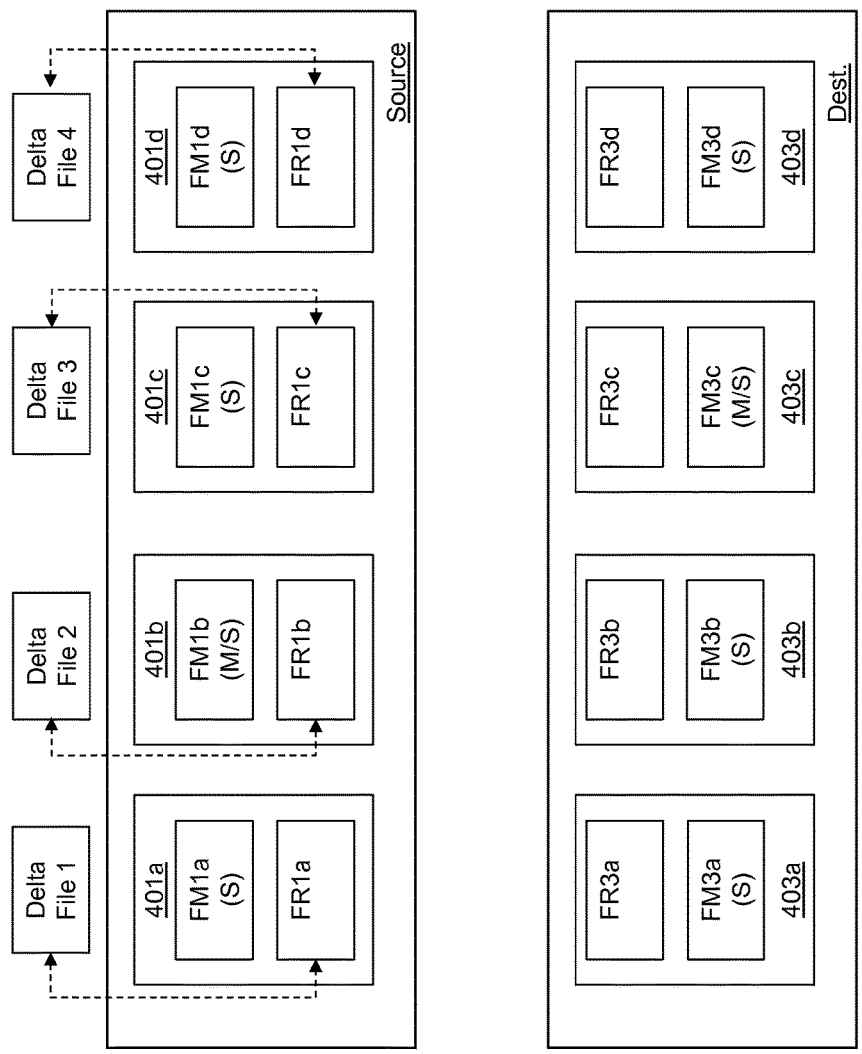

Each file management instance FM1a-d may then request its corresponding file replication instance FR1a-d to perform the actual replication of the files as shown. The replication of files performed by the file replication instances FR1a-d may involve replicating the differences between the current set of files to be replicated and the previous set of files that were replicated, as well as replicating metadata associated with those differences. This is illustrated in FIG. 4C, where each file replication instance FR1a-d at the source creates a delta file representative of the difference between the current set of files to be replicated and a previously replicated set of files along with metadata (not shown) associated with those differences. The first file replication instance FR1a creates a first delta file and metadata for that delta file from files 1-4. The second file replication instance FR1b creates a second delta file and metadata for that delta file from files 5-8. The third file FR1c replication instance creates a third delta file and metadata for that delta file from files 9-12. Lastly, the fourth file replication instance FR1d creates a fourth delta file and metadata for that delta file from files 13-16. By comparing the current set of files to be replicated with a previously replicated set of files to create delta files, the amount of data transferred during replication may be significantly reduced, as only differences between a current set of files to be replicated and a previous set of files that were replicated are transmitted rather than the entirety of the current set of files.

Once the files to be replicated have been processed by their corresponding slave and master file management FM1a-d and corresponding file replication instances FR1a-d, steps are taken to transmit those files to the destination cluster of nodes where they are stored. The file replication instances FR1a-d at the source each identify the master file management instance FM3c at the destination in the manner described above. The file replication instances FR1a-d at the source then request the master file management instance FM3c at the destination to identify the file replication instances FR3a-d at the destination for which they are assigned. The file replication instances FR3a-d at the destination are assigned to the file replication instances FR1a-d at the source in the manner described above.

Figure 4D:
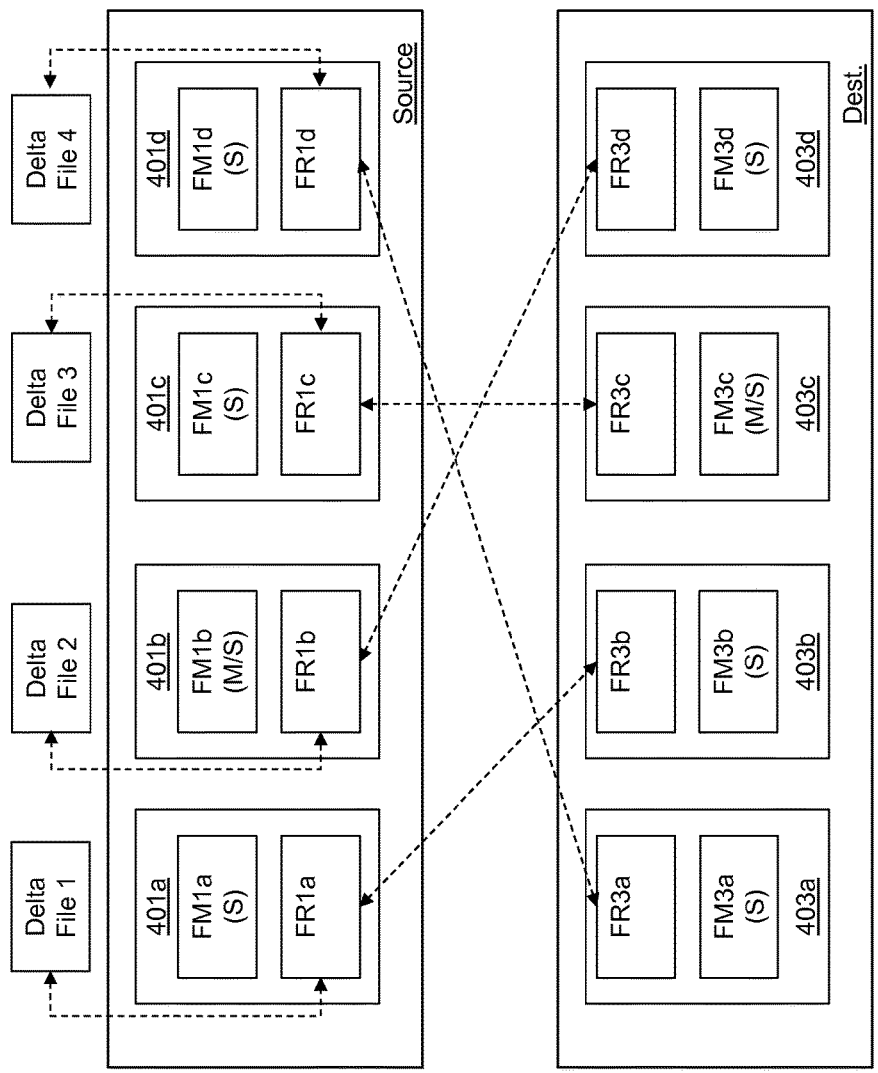

In FIG. 4D, the first file replication instance FR1a at the source is assigned to the second file replication instance FR3b at the destination. The second file replication instance FR1b at the source is assigned to the fourth file replication instance FR3d at the destination. The third file replication instance FR1c at the source is assigned to the third file replication FR3c instance at the destination. The fourth file replication instance FR1d at the source is assigned to the first file replication instance FR3a at the destination. The assignment in FIG. 4D is performed on a one-to-one basis, however, as noted above assignment may performed on an any-to-any basis, such that any number of file replication instances at the source may be assigned to any number of file replication instances at the destination.

After the master file management instance FM3c at the destination has assigned the file replication instances FR3a-d at the destination to corresponding file replication instances FR1a-d at the source, it provides the information to the requesting file replication instances FR1a-d at the source. The file replication instances FR1a-d at the source then complete data replication by transmitting processed files (e.g., delta files and corresponding metadata) to corresponding file replication instances FR3a-d at the destination. The processed files are stored at the destination cluster of nodes and may be recovered from the destination upon failure of the source.

FIGS. 5A-D illustrate another example of data replication where six controller VMs 501a-f at the source and four controller VMs 503a-d at the destination are utilized to perform data replication on a set of 24 files. Initially, an election process is held at the source cluster of nodes as well as the destination cluster of nodes to elect master and slave file management instances.

Figure 5A:
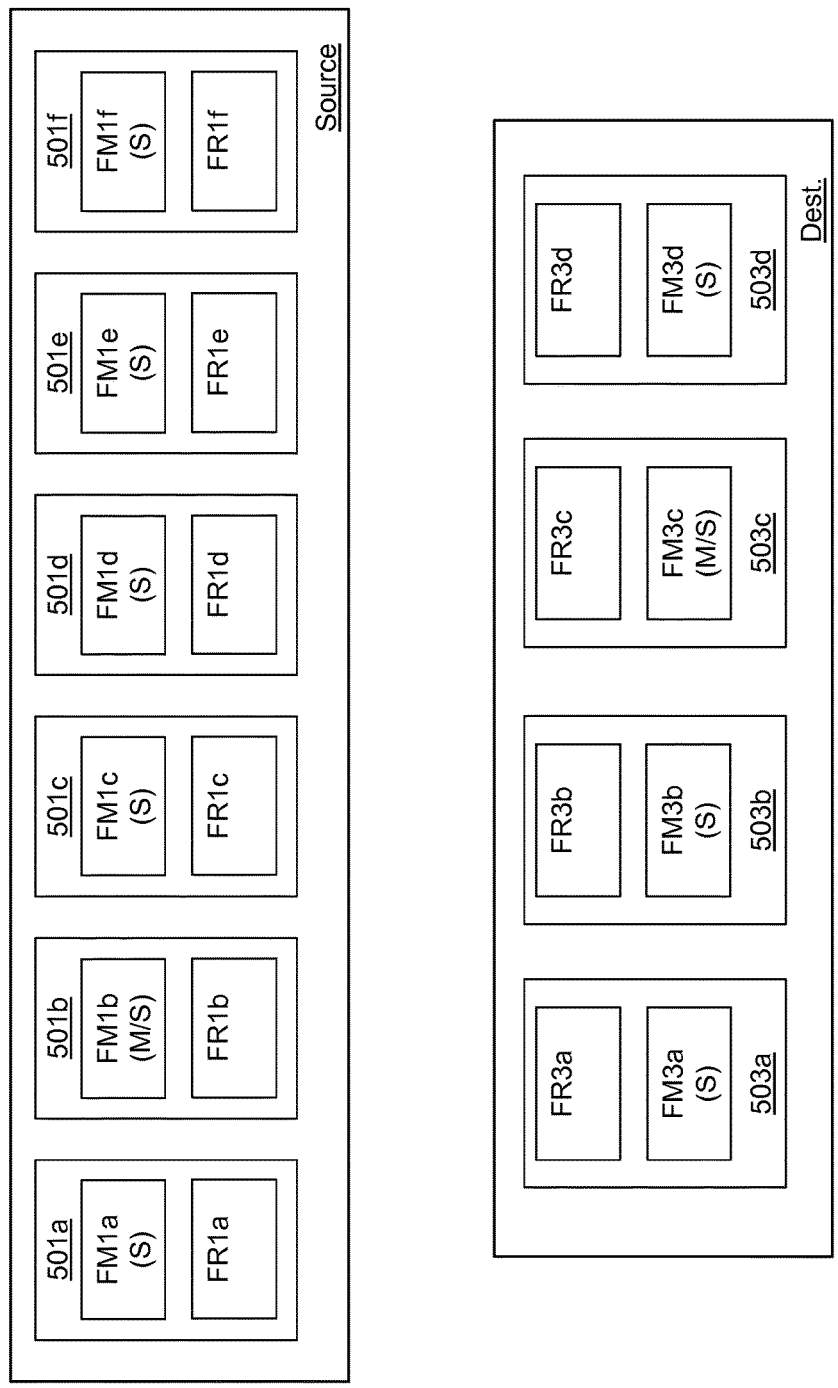
FIGS. 5A-D are schematic diagrams illustrating an examples of data replication according to some embodiments of the invention.

FIG. 5A illustrates the state of the source cluster of nodes and the destination cluster of nodes after the election process has occurred. As illustrated in FIG. 5A, all of the file management instances FM1a-f belonging to controller VMs 501a-f within the source cluster of nodes are candidates for fulfilling the roles of master file management instance and slave file management instances. Likewise, all of the file management instances FM3a-d belonging to controller VMs 503a-d within the destination cluster of nodes are candidates for fulfilling the roles of master file management instance and slave file management instances. However, it is important to note that in other circumstances, only file management instances belonging to controller VMs that meet certain criteria may be selected as candidates for fulfilling the roles of master file management instance and slave file management instances at either the source or the destination.

As noted above, the master file management instance acts a leader and assigns work to be distributed amongst the slave file management instances. The slave file management instances then perform work at the direction of the master file management instance. Although the master file management instance assigns work to be distributed amongst the slave file management instances, it too acts as a slave file management instance in the sense that it also performs a subset of work.

In the source cluster of nodes, a second file management instance FM1b is elected as the master file management instance as denoted by the identifier M/S, while a first file management instance FM1a, third file management instance FM1c, fourth file management instance FM1d, fifth file management instance FM1e, and sixth file management instance FM1f are elected as slave file management instances as denoted by the identifier S. Also, as illustrated in FIG. 5A, replication management instances FR1a-f are associated with corresponding file management instances FM1a-f at the source cluster of nodes.

Likewise, in the destination cluster of nodes a third file management instance FM3c is elected as the master file management instance as denoted by the identifier M/S, while a first file management instance FM3a, second file management instance FM3b and fourth file management instance FM3d are elected as slave file management instances as denoted by the identifier S. Also, as illustrated in FIG. 5A, replication management instances FR3a-d are associated with corresponding file management instances FM3a-d at the destination cluster of nodes.

Figure 5B:
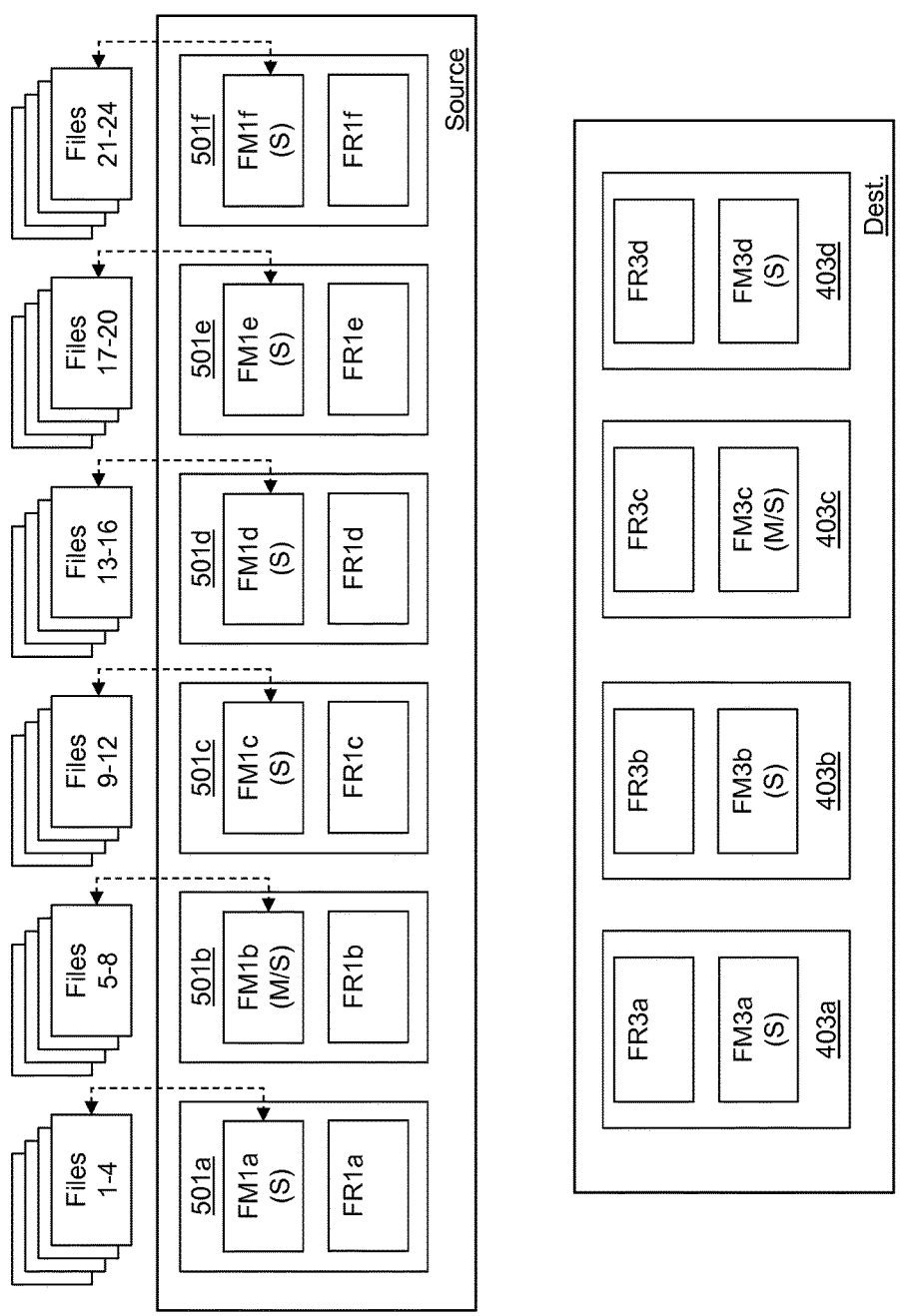

A determination is then made as to which set of files are to be replicated, which is typically accomplished by taking a snapshot of the virtual disks residing within the cluster. In the example of FIGS. 5A-D, files 1-24 are identified as those to be replicated. The files that are identified for replication are then assigned to the master and slave file management instances FM1a-f at the source cluster as illustrated in FIG. 5B. In FIG. 5B, the files are equally distributed amongst the slave file management instances FM1a, c-f and the master file management instance FM1b at the source. Such work distribution may be preferred in the situation where all of the file management instances acting as master and slaves have a similar capacity for work. In FIG. 5B, files 1-4 are assigned to a first slave file management instance FM1a at the source, files 5-8 are assigned to the master file management instance FM1b at the source, files 9-12 are assigned to a second slave file management instance FM1c at the source, files 13-16 are assigned to a third slave file management instance FM1d at the source, files 17-20 are assigned to a fourth slave file management instance FM1d at the source and files 21-24 are assigned to a fifth slave file management instance FM1e at the source. These files are assigned to the different slave and master file management instances FM1a-f for the purpose of processing prior to transmission.

The files in the example illustrated in FIGS. 5A-D are equally distributed amongst the slave and master file management instances FM1a-f. However, as noted above, the assignment of files may be distributed based on a current workload of the slave file management instances FM1a, c-f and master file management instance FM1b.

Once the files have been assigned by the master file management instance FM1b to the slave and master file management instances FM1a-f, the file management instances FM1a-f may perform a portion of the processing of the files for replication. The portion of the processing performed by the file management instances FM1a-f may involve determining the difference (e.g., delta) between a previously replicated set of files and the current set of files to be replicated.

Figure 5C:
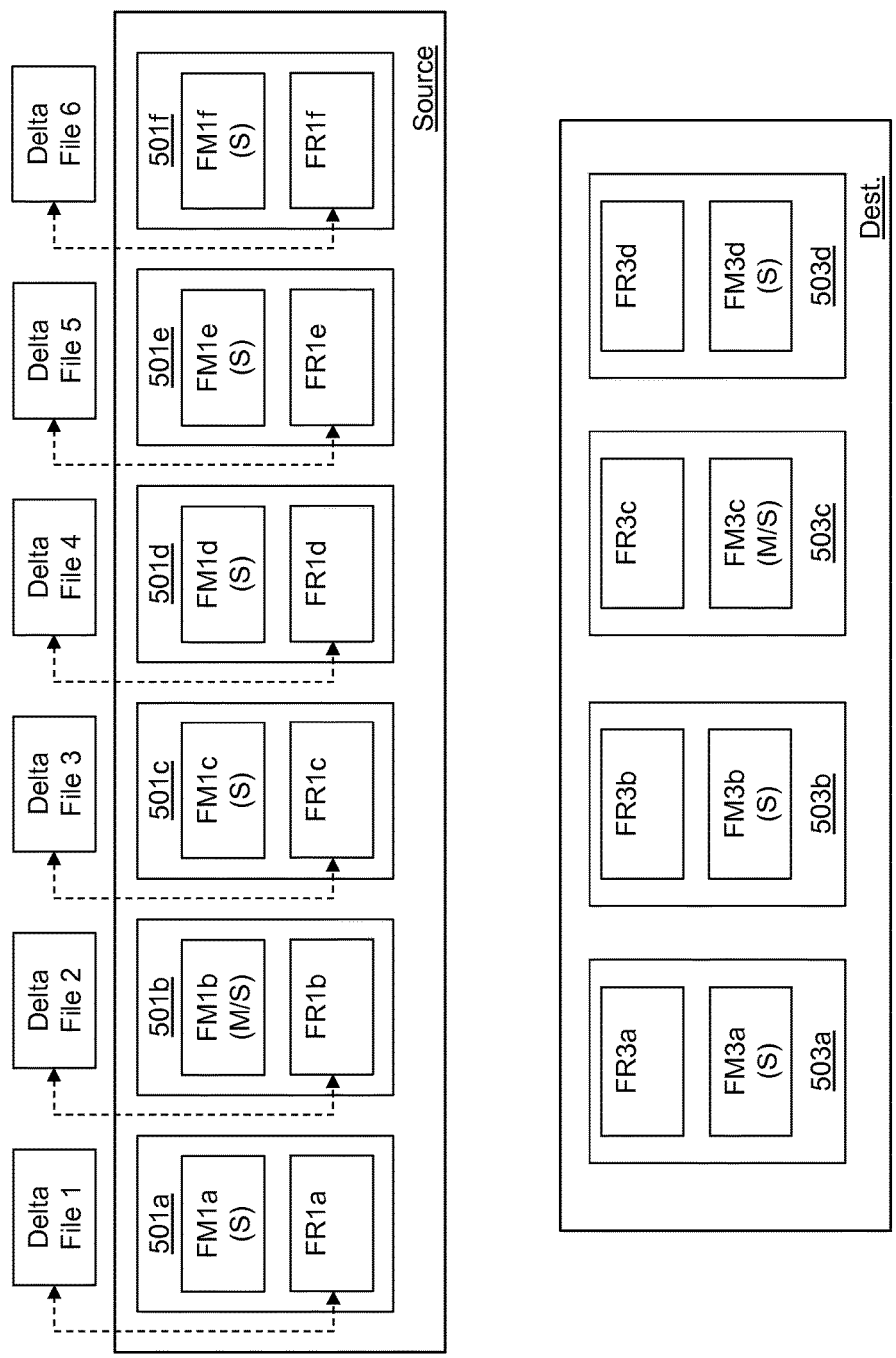

Each file management instance FM1a-f may then request its corresponding file replication instance FR1a-f to perform to perform the actual replication of the files as shown. The replication of files performed by the file replication instances FR1a-f may involve replicating the differences between the current set of files to be replicated and the previous set of files that were replicated, as well as replicating metadata associated with those differences. This is illustrated in FIG. 5C, where each file replication instance FR1a-f at the source creates a delta file representative of the difference between the current set of files to be replicated and a previously replicated set of files along with metadata (not shown) associated with those differences. The first file replication instance FR1a creates a first delta file and metadata for that delta file from files 1-4. The second file replication instance FR1b creates a second delta file and metadata for that delta file from files 5-8. The third file replication FR1c instance creates a third delta file and metadata for that delta file from files 9-12. The fourth file replication instance FR1d creates a fourth delta file and metadata for that delta file from files 13-16. The fifth file replication instance FR1e creates a fifth delta file and metadata for that delta file from files 17-20. Lastly, the sixth file replication instance FR1f creates a sixth delta file and metadata for that delta file from files 21-24. By comparing the current set of files to be replicated with a previously replicated set of files to create delta files, the amount of data transferred during replication may be significantly reduced, as only differences between a current set of files to be replicated and a previous set of files that were replicated are transmitted rather than the entirety of the current set of files.

Once the files to be replicated have been processed by their corresponding file replication instances FR1a-f, steps are taken to transmit those files to the destination cluster of nodes where they are stored. The file replication instances FR1a-f at the source each identify the master file management instance FM3c at the destination in the manner described above. The file replication instances FR1a-f at the source then request the master file management instance FM3c at the destination to identify the file replication instances FR3a-d at the destination for which they are assigned. The file replication instances FR3a-d at the destination are assigned to the file replication instances FR1a-f at the source in the manner described above.

Figure 5D:
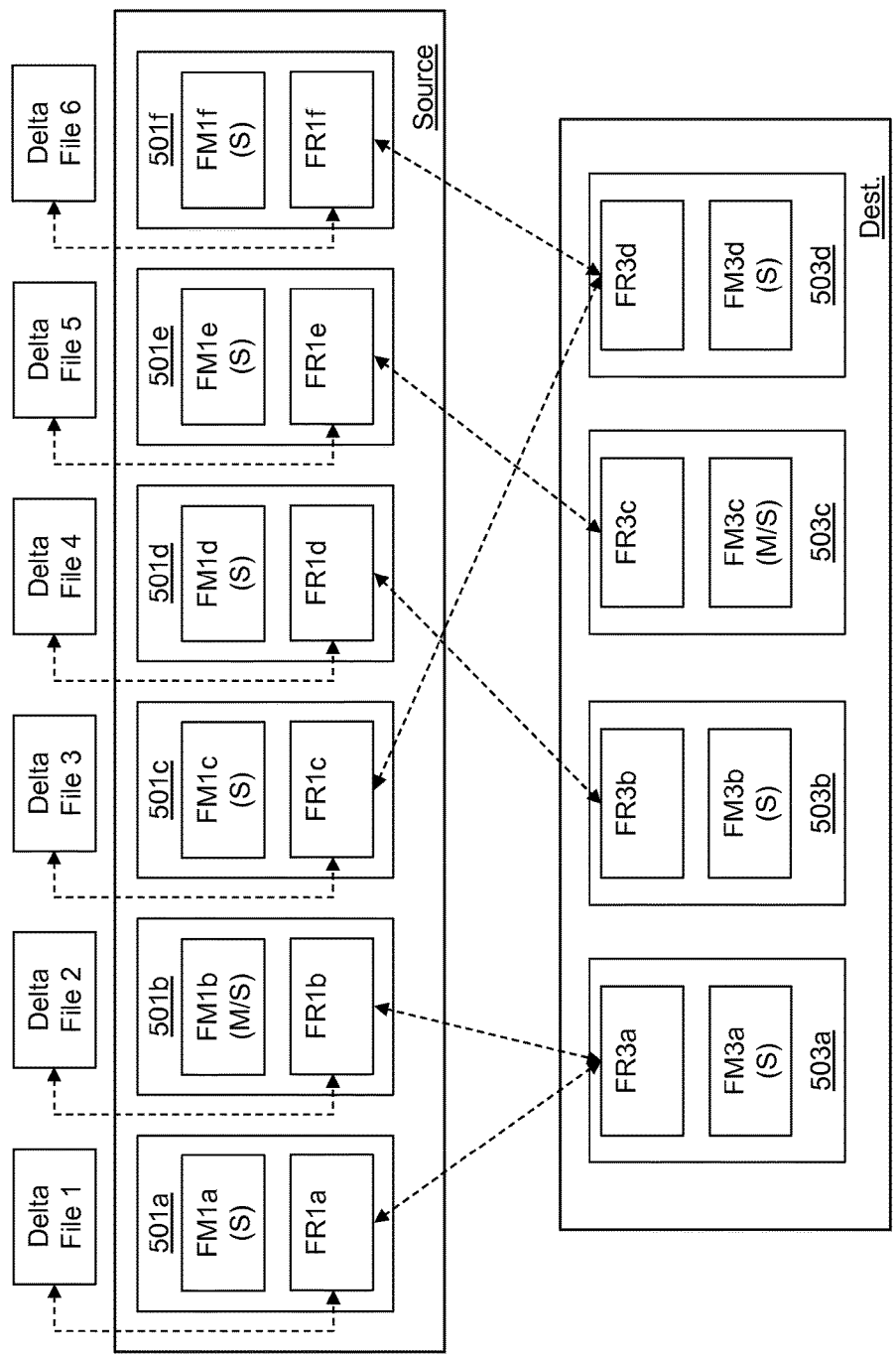

In FIG. 5D, the first file replication instance FR1a and second file replication instance FR1b at the source are assigned to the first file replication instance FR3a at the destination. The third file replication instance FR1c and sixth file replication instance FR1f at the source are assigned to the fourth file replication instance FR3d at the destination. The fourth file replication instance FR1d at the source is assigned to the second file replication instance FR3b at the destination. The fifth file replication instance FR1e at the source is assigned to the third file replication instance FR3c at the destination. The assignment in FIG. 5D is performed on a 6-to-4 basis, however, as noted above assignment may performed on an any-to-any basis, such that any number of file replication instances at the source may be assigned to any number of file replication instances at the destination.

After the master file management instance FR3*b* at the destination has assigned the file replication instances FR3*a-d* at the destination to corresponding file replication instances at the source FR1*a-f*, it provides the information to the requesting file replication instances FR1*a-f* at the source. The file replication instances FR1*a-f* at the source then complete data replication by transmitting processed files (e.g., delta files and corresponding metadata) to corresponding file replication instances FR3*a-d* at the destination. The processed files are stored at the destination cluster of nodes and may be recovered from the destination upon failure of the source.

System Architecture

Figure 6:
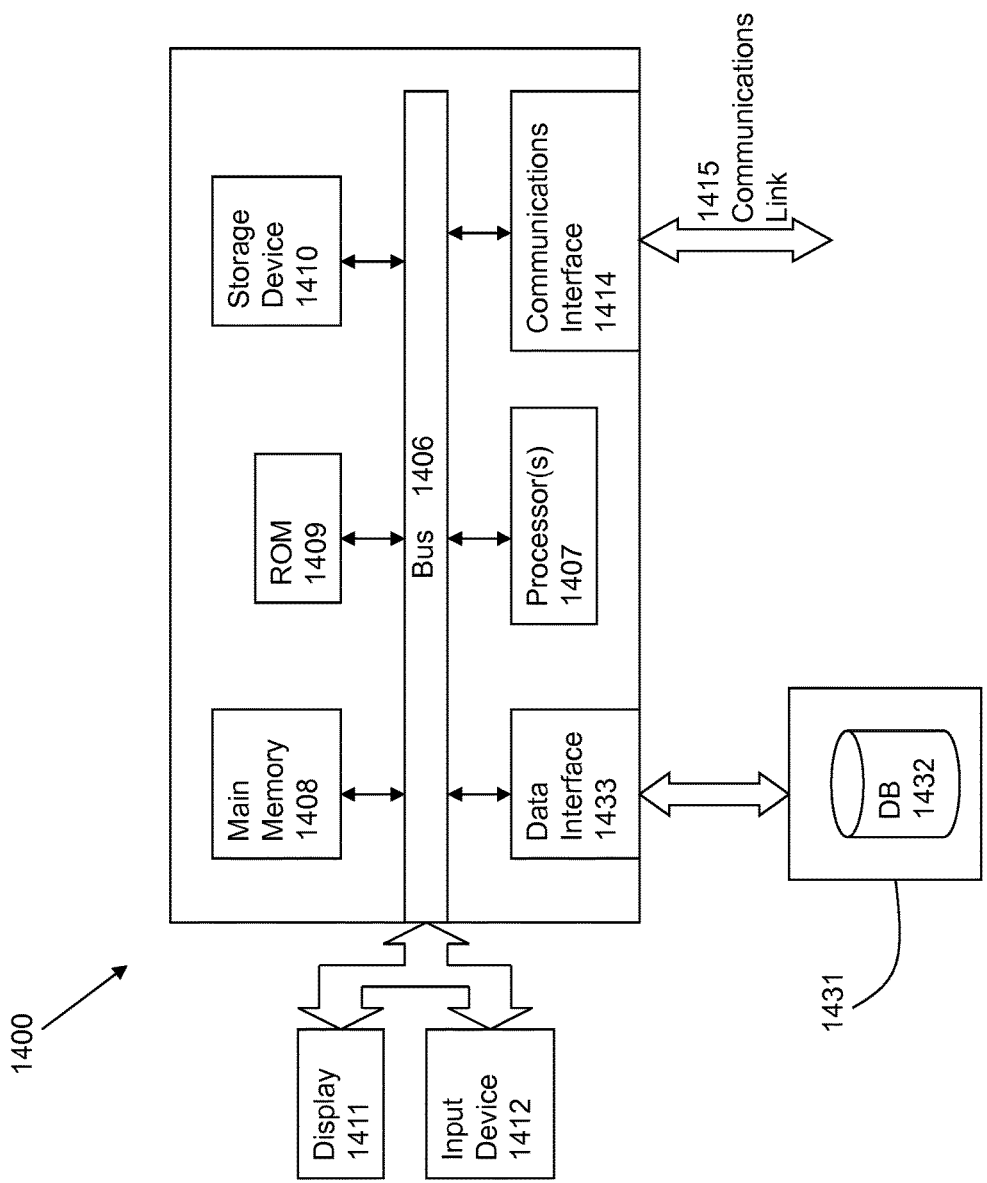
FIG. 6 is a block diagram of an illustrative computing system suitable for implementing an embodiment of the present invention

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for performing distributed data replication, the method comprising:
   maintaining at a source cluster of nodes, the source cluster of nodes comprising:
      a plurality of source nodes, wherein the plurality of source nodes comprises a hypervisor and source user virtual machines,
      a plurality of source storage devices that are accessed by the source user virtual machines, and
      a source controller virtual machine on each of the plurality of source nodes to manage access by the source user virtual machines to the plurality of source storage devices, wherein a plurality of source controller virtual machines performs a method for performing distributed data replication from the source cluster of nodes to a destination cluster of nodes, the method comprising:
         electing a master file management instance and slave file management instances for the source cluster of nodes,
         identifying a set of files to be replicated,
         assigning, by the master file management instance, work pertaining to the identified set of files to be distributed amongst the master file management instance and the slave file management instances,
         processing the work pertaining to the identified set of files by both the master file management instance and the slave file management instances, wherein the work comprises determining differences between the identified set of files to be replicated and a previous set of files that were replicated, and
         performing data replication on the processed work pertaining to the identified set of files by file replication instances corresponding to the master file management instance and slave file management instances at the source cluster of nodes;
   maintaining at a destination cluster of nodes, the destination cluster of nodes comprising:
      a plurality of destination nodes, wherein the plurality of destination nodes comprises a hypervisor and destination user virtual machines;
      a plurality of destination storage devices that are accessed by the destination user virtual machines; and
      a destination controller virtual machine on each of the plurality of destination nodes to manage access by the destination user virtual machines to the plurality of destination storage devices; and
   wherein file replication instances belonging to the source controller virtual machines at the source cluster of nodes are assigned to file replication instances belonging to the destination controller virtual machines at the destination cluster of nodes on an any-to-any basis for data replication.

2. The method of claim 1, wherein all file management instances belonging to controller VMs within the source cluster of nodes are candidates for election.

3. The method of claim 1, wherein only file management instances belonging to controller VMs within the source cluster of nodes that meet a set of criteria are candidates for election.

4. The method of claim 3, wherein the set of criteria includes a threshold for I/O requests.

5. The method of claim 1, wherein identifying the set of files to be replicated involves taking a snapshot of virtual disks residing within the source cluster of nodes.

6. The method of claim 5, wherein the snapshot is taken across all nodes in the source cluster of nodes.

7. The method of claim 5, wherein the snapshot is taken across a subset of nodes in the source cluster of nodes.

8. The method of claim 5, wherein the snapshot is taken across a subset of virtual disks within a node of the source cluster of nodes.

9. The method of claim 1, wherein the assignment of the work pertaining to the identified set of files to the master file management instance and the slave file management instances is based on a current workload of the master file management instance and the slave file management instances.

10. The method of claim 1, wherein the assignment of the work pertaining to the identified set of files to the master file management instance and the slave file management instances is equally distributed.

11. The method of claim 1, wherein the master file management instance and the slave file management instances are dynamically elected when initiating data replication.

12. A computer program product embodied on a non-transitory computer readable medium, the non-transitory computer readable medium having stored thereon a sequence of instructions which, when executed by a processor causes the processor to execute a method for performing distributed data replication, comprising:
  maintaining at a source cluster of nodes, the source cluster of nodes comprising:
    a plurality of source nodes, wherein the plurality of source nodes comprises a hypervisor and source user virtual machines;
    a plurality of source storage devices that are accessed by the source user virtual machines; and
    a source controller virtual machine on each of the plurality of source nodes to manage access by the source user virtual machines to the plurality of source storage devices, wherein a plurality of source controller virtual machines performs a method for performing distributed data replication from the source cluster of nodes to a destination cluster of nodes, the method comprising:
      electing a master file management instance and slave file management instances for the source cluster of nodes,
      identifying a set of files to be replicated,
      assigning, by the master file management instance, work pertaining to the identified set of files to be distributed amongst the master file management instance and the slave file management instances,
      processing the work pertaining to the identified set of files by both the master file management instance and the slave file management instances, wherein the work comprises determining differences between the identified set of files to be replicated and a previous set of files that were replicated, and
      performing data replication on the processed work pertaining to the identified set of files by file replication instances corresponding to the master file management instance and slave file management instances at the source cluster of nodes;
  maintaining at a destination cluster of nodes, the destination cluster of nodes comprising:
    a plurality of destination nodes, wherein the plurality of destination nodes comprises a hypervisor and destination user virtual machines;
    a plurality of destination storage devices that are accessed by the destination user virtual machines; and
    a destination controller virtual machine on each of the plurality of destination nodes to manage access by the destination user virtual machines to the plurality of destination storage devices; and
  wherein file replication instances belonging to the source controller virtual machines at the source cluster of nodes are assigned to file replication instances belonging to the destination controller virtual machines at the destination cluster of nodes on an any-to-any basis for data replication.

13. The computer program product of claim 12, wherein all file management instances belonging to controller VMs within the source cluster of nodes are candidates for election.

14. The computer program product of claim 12, wherein only file management instances belonging to controller VMs within the source cluster of nodes that meet a set of criteria are candidates for election.

15. The computer program product of claim 14, wherein the set of criteria includes a threshold for I/O requests.

16. The computer program product of claim 12, wherein identifying the set of files to be replicated involves taking a snapshot of virtual disks residing within the source cluster of nodes.

17. The computer program product of claim 16, wherein the snapshot is taken across all nodes in the source cluster of nodes.

18. The computer program product of claim 16, wherein the snapshot is taken across a subset of nodes in the source cluster of nodes.

19. The computer program product of claim 16, wherein the snapshot is taken across a subset of virtual disks within a node of the source cluster of nodes.

20. The computer program product of claim 12, wherein the assignment of the work pertaining to the identified set of files to the master file management instance and the slave file management instances is based on a current workload of the master file management instance and the slave file management instances.

21. The computer program product of claim 12, wherein the assignment of the work pertaining to the identified set of files to the master file management instance and the slave file management instances is equally distributed.

22. The computer program product of claim 12, wherein the master file management instance and the slave file management instances are dynamically elected when initiating data replication.

23. A system for performing distributed data replication, comprising:
- a source cluster of nodes, comprising:
  - a plurality of source nodes, wherein the plurality of source nodes comprises a hypervisor and source user virtual machines,
  - a plurality of source storage devices that are accessed by the source user virtual machines, and
  - a source controller virtual machine on each of the plurality of source nodes to manage access by the source user virtual machines to the plurality of source storage devices, wherein a plurality of source controller virtual machines performs a method for performing distributed data replication from the source cluster of nodes to a destination cluster of nodes, the method comprising:
    - electing a master file management instance and slave file management instances for the source cluster of nodes,
    - identifying a set of files to be replicated,
    - assigning, by the master file management instance, work pertaining to the identified set of files to be distributed amongst the master file management instance and the slave file management instances,
    - processing the work pertaining to the identified set of files by both the master file management instance and the slave file management instances, wherein the work comprises determining differences between the identified set of files to be replicated and a previous set of files that were replicated, and
    - performing data replication on the processed work pertaining to the identified set of files by file replication instances corresponding to the master file management instance and slave file management instances at the source cluster of nodes;
- a destination cluster of nodes, comprising:
  - a plurality of destination nodes, wherein the plurality of destination nodes comprises a hypervisor and destination user virtual machines,
  - a plurality of destination storage devices that are accessed by the destination user virtual machines, and
  - a destination controller virtual machine on each of the plurality of destination nodes to manage access by the destination user virtual machines to the plurality of destination storage devices; and
- wherein file replication instances belonging to the source controller virtual machines at the source cluster of nodes are assigned to file replication instances belonging to the destination controller virtual machines at the destination cluster of nodes on an any-to-any basis for data replication.

24. The system of claim 23, wherein all file management instances belonging to controller VMs within the source cluster of nodes are candidates for election.

25. The system of claim 23, wherein only file management instances belonging to controller VMs within the source cluster of nodes that meet a set of criteria are candidates for election.

26. The system of claim 25, wherein the set of criteria include a threshold for I/O requests.

27. The system of claim 23, wherein identifying the set of files to be replicated involves taking a snapshot of virtual disks residing within the source cluster of nodes.

28. The system of claim 27, wherein the snapshot is taken across all nodes in the source cluster of nodes.

29. The system of claim 27, wherein the snapshot is taken across a subset of nodes in the source cluster of nodes.

30. The system of claim 27, wherein the snapshot is taken across a subset of virtual disks within a node of the source cluster of nodes.

31. The system of claim 23, wherein the assignment of the work pertaining to the identified set of files to the master file management instance and the slave file management instances is based on a current workload of the master file management instance and the slave file management instances.

32. The system of claim 23, wherein the assignment of the work pertaining to the identified set of files to the master file management instance and the slave file management instances is equally distributed.

33. The system of claim 23, wherein the master file management instance and the slave file management instances are dynamically elected when initiating data replication.

* * * * *